(12) United States Patent
Nakamura

(10) Patent No.: US 6,979,486 B2
(45) Date of Patent: Dec. 27, 2005

(54) MULTILAYER CERAMIC CAPACITOR

(75) Inventor: Toshiya Nakamura, Tokyo (JP)

(73) Assignee: Taiyo Yuden Co., Ltd., Tokyo (JP)

(*) Notice: Subject to any disclaimer, the term of this patent is extended or adjusted under 35 U.S.C. 154(b) by 32 days.

(21) Appl. No.: 10/403,392

(22) Filed: Mar. 31, 2003

(65) Prior Publication Data
US 2003/0190462 A1 Oct. 9, 2003

Related U.S. Application Data

(63) Continuation-in-part of application No. 09/620,873, filed on Jul. 21, 2000, now abandoned.

(30) Foreign Application Priority Data
Jul. 21, 1999 (JP) ................... 11-205588

(51) Int. Cl.[7] ............ B32B 3/26; H01G 4/005; H01G 4/008; H01G 4/06
(52) U.S. Cl. ............... 428/188; 428/304.4; 428/315.5; 428/316.6; 361/303; 361/305; 361/311; 361/321.2
(58) Field of Search .................. 428/304.4, 315.5, 428/316.6, 325, 328, 188, 329; 361/303, 361/305, 321.4, 311, 306, 320, 313, 321.2

(56) References Cited

U.S. PATENT DOCUMENTS

| 4,467,396 A | * | 8/1984 | Leupold et al. ........... 361/321.4 |
| 4,586,972 A | | 5/1986 | Yokotani et al. |
| 5,172,299 A | | 12/1992 | Yamada et al. |
| 6,052,272 A | | 4/2000 | Kuroda et al. |
| 6,331,929 B1 | * | 12/2001 | Masuda ...................... 361/303 |

FOREIGN PATENT DOCUMENTS

| JP | 2156619 | | 6/1990 |
| JP | 05090064 A | * | 4/1993 |

* cited by examiner

Primary Examiner—Harold Pyon
Assistant Examiner—Catherine A. Simone
(74) Attorney, Agent, or Firm—Katten Muchin Rosenman LLP

(57) ABSTRACT

A multilayer ceramic capacitor includes ceramic layers made of a dielectric material, and internal electrodes made of a conductive material. The internal electrodes are provided with cavities which have an average size ranging from about 1.0 $\mu$m to about 10 $\mu$m and occupy about 25% to about 75% of an area of each internal electrode. The ceramic layers and the internal electrodes are stacked alternately and each cavity is devoid of the dielectric material and the conductive material.

6 Claims, 4 Drawing Sheets

MULTILAYER CERAMIC CAPACITOR

CROSS REFERENCE TO RELATED APPLICATION

This application is a continuation-in-part application of U.S. Ser. No. 09/620,873 filed on Jul. 21, 2000 now abandoned, which claims priorities thereon pursuant to 35 USC 120.

FIELD OF THE INVENTION

The present invention relates to a multilayer ceramic capacitor comprising a laminated body including internal electrodes and ceramic layers, and external electrodes disposed at end portions of the laminated body and connected to the internal electrodes; and, more particularly, to a multilayer ceramic capacitor comprising thin internal electrodes with thickness of less than or equal to 3 $\mu$m and being capable of preventing or reducing crack developments inside the laminated body during, e.g., sintering.

BACKGROUND OF THE INVENTION

A multilayer ceramic capacitor normally comprises a laminated body including ceramic layers made of a dielectric material and external electrodes, some of the ceramic layers having internal electrodes thereon. The ceramic layers are stacked together in a manner that the internal electrodes are alternately exposed at opposite sides of the laminated body. The external electrodes are disposed at the end portions including the opposite sides of the laminated body and are connected to respective sets of internal electrodes of the laminated body.

FIG. 3 illustrates a typical arrangement of a laminated body 3 of such a multilayer ceramic capacitor. The laminated body 3 is formed by stacking ceramic layers 7 having internal electrodes 5 and 6 and made of a dielectric material, and a plurality of bare ceramic layers 7' without any internal electrodes. The bare ceramic layers 7' without any internal electrodes may be called dummy sheets. The ceramic layers 7 are stacked in a manner to have the internal electrodes 5 and 6 alternately exposed at opposite sides of the laminated body 3. A number of dummy sheets are disposed on top of the uppermost ceramic layer 7 as well as below the undermost ceramic layer 7. As shown in FIG. 1, a pair of external electrodes 2 are, respectively, disposed at the opposite end portions of the laminated body 3 and are connected to the internal electrodes 5 and 6.

The process for manufacturing such a multilayer ceramic capacitor in accordance with the prior art will now be described.

First, an amount of slurry is prepared by mixing fine ceramic powder with an organic binder. Then, a ceramic green sheet is obtained by thinly casting the slurry on a carrier film comprised of, e.g., polyethylene terephthalate film by using a doctor blade method. Next, the ceramic green sheet on the carrier film is dried and cut by using a cutting head into a plurality of ceramic green sheets of a desired size. Then a conductive paste for internal electrodes is printed on the surfaces of the ceramic green sheets and dried. As a result, as shown in FIG. 6, a plurality of ceramic green sheets 1a, 1b having internal electrode patterns 2a and 2b printed thereon lengthwise and widthwise are obtained.

Subsequently, the ceramic green sheets 1a, 1b having the internal electrode patterns 2a and 2b are stacked and a number of bare ceramic green sheets 1 without any internal electrode patterns are stacked both on top of the uppermost ceramic green sheet 1a and below the undermost ceramic green sheet 1b. Then, a laminated ceramic body is obtained by pressing the stacked ceramic green sheets. The ceramic green sheets 1a and 1b are stacked in a manner that the internal electrode patterns 2a of the ceramic green sheets 1a are shifted with respect to the internal electrode patterns 2b of the ceramic green sheets 1b by half a pattern size along lengthwise. Thereafter, the laminated ceramic body is diced into a number of unsintered laminated bodies, each having a desired size. The unsintered laminated bodies are then sintered to obtain the laminated bodies 3.

Next, a conductive paste is applied on opposite end portions of the laminated body 3 and baked to form conductive films. A pair of external electrodes 2 is formed on opposite end portions, as shown in FIG. 1, by plating the surface of the conductive film.

FIG. 2 shows a partial cross-sectional view of the laminated body of a multilayer ceramic capacitor. In the laminated body of the prior art multilayer ceramic capacitor, empty spaces between conductive particles shown in FIG. 2 are generally filled with ceramic particles.

However, the expansion or shrinkage rate of the ceramic layers 7 caused by temperature changes may be different from that of the internal electrodes 5 and 6, which may in turn cause micro cracks developed in the laminated body 3. Such tendency may become rather serious when the laminated body 3 includes, e.g., more than a hundred layers. Especially, when the multilayer ceramic capacitors are soldered on a circuit board for the manufacture of end products such as cellular phone, cracks can be developed in the laminated body 3.

SUMMARY OF THE INVENTION

It is, therefore, an object of the present invention to provide a multilayer ceramic capacitor that experiences little stress under temperature changes such that substantially no cracks are developed in the laminated body 3 thereof.

In accordance with a preferred embodiment of the present invention, there is provided a multilayer ceramic capacitor including: ceramic layers made of a dielectric material; and internal electrodes made of a conductive material, each internal electrode being provided with cavities and the cavities having an average size ranging from about 1.0 $\mu$m to about 10 $\mu$m and occupying about 25% to about 75% of an area of each internal electrode, wherein the ceramic layers and the internal electrodes are stacked alternately and each cavity is devoid of the dielectric material and the conductive material.

The internal electrodes preferably have a film thickness of less than or equal to 3 $\mu$m.

The term "the area of an internal electrode" as used herein refers to the apparent area of the internal electrode including the area occupied by the cavities. For instance, when the internal electrode has a rectangular shape, the area of the internal electrode is given by the product of the two side lengths thereof.

By forming the cavities in the internal electrodes, the stress caused by the differences in the shrinkage rates between the internal electrodes and the ceramic layers can be alleviated, to thereby prevent the development of cracks effectively.

It is preferable that the cavities occupy about 25% to about 75% of the area of each internal electrode, and, more preferably, about 35% to about 65%; and, most preferably, about 40% to about 60% thereof. When the area occupied by the cavities is in a range of 25% to 75%, and the average size of the cavities ranges from about 1.0 $\mu$m to about 10 $\mu$m, the crack development can be more effectively prevented and a desired capacitance can be easily achieved.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The preferred embodiments of the present invention will now be described in detail with reference to the accompanying drawings.

First, an amount of slurry is prepared by uniformly dispersing dielectric ceramic powder such as barium titanate into an organic binder dissolved in a solvent. The organic binder may be selected from the group consisting of abietic resin, polyvinyl butyral, ethyl cellulose, acrylic resin, and the like. The solvent may be selected from the group consisting of ethanol, terpineol, butyl carbitol, toluene, kerosene, and the like. The slurry is thinly and uniformly coated on a base film such as polyethylen terephthalate film of a predetermined thickness and then dried, to thereby form a ceramic green sheet. Thereafter, the ceramic green sheet is cut into a plurality of pieces of a predetermined size.

Next, the conductive paste for the internal electrodes is obtained by mixing about 100 weight % of a conductive material, e.g., Ni powder, with about 3 to about 12 weight % of a binder, e.g., ethyl cellulose, and uniformly dispersing the mixture in about 80 to about 120 weight % of a solvent, e.g., terpineol. Also, an optional amount up to about 20 weight %, i.e., 0 to 20 weight %, of the dielectric ceramic powder, e.g., a barium-titanate may be included in the mixture. The weight percentages used herein are measured based on the total weight of the conductive material. The preferred composition of the mixture may vary with the thickness of the internal electrodes.

Thereafter, two types of internal electrode patterns 2a and 2b are, respectively, printed on the ceramic green sheets 1a, 1b by using a conductive paste such as the Ni paste obtained by the process described above.

Figure 1:
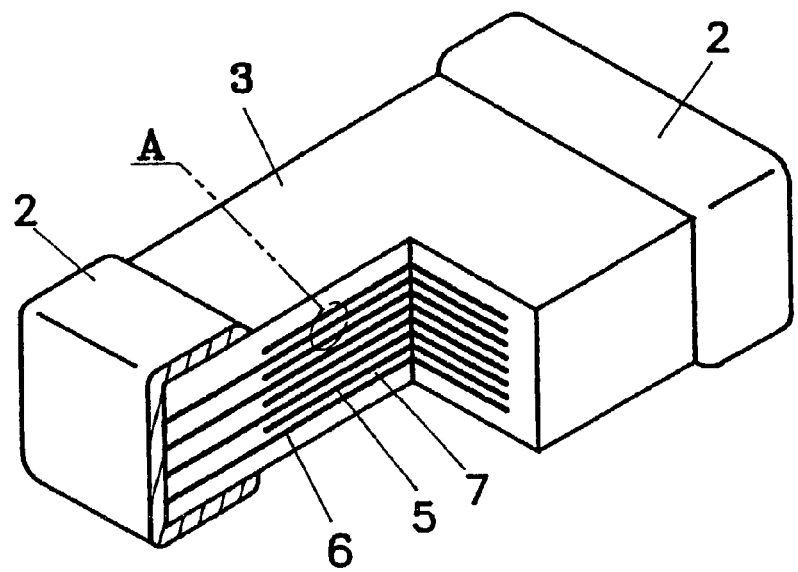
FIG. 1 shows a partial cutaway perspective view of a typical multilayer ceramic capacitor including the inventive capacitor.
Figure 3:
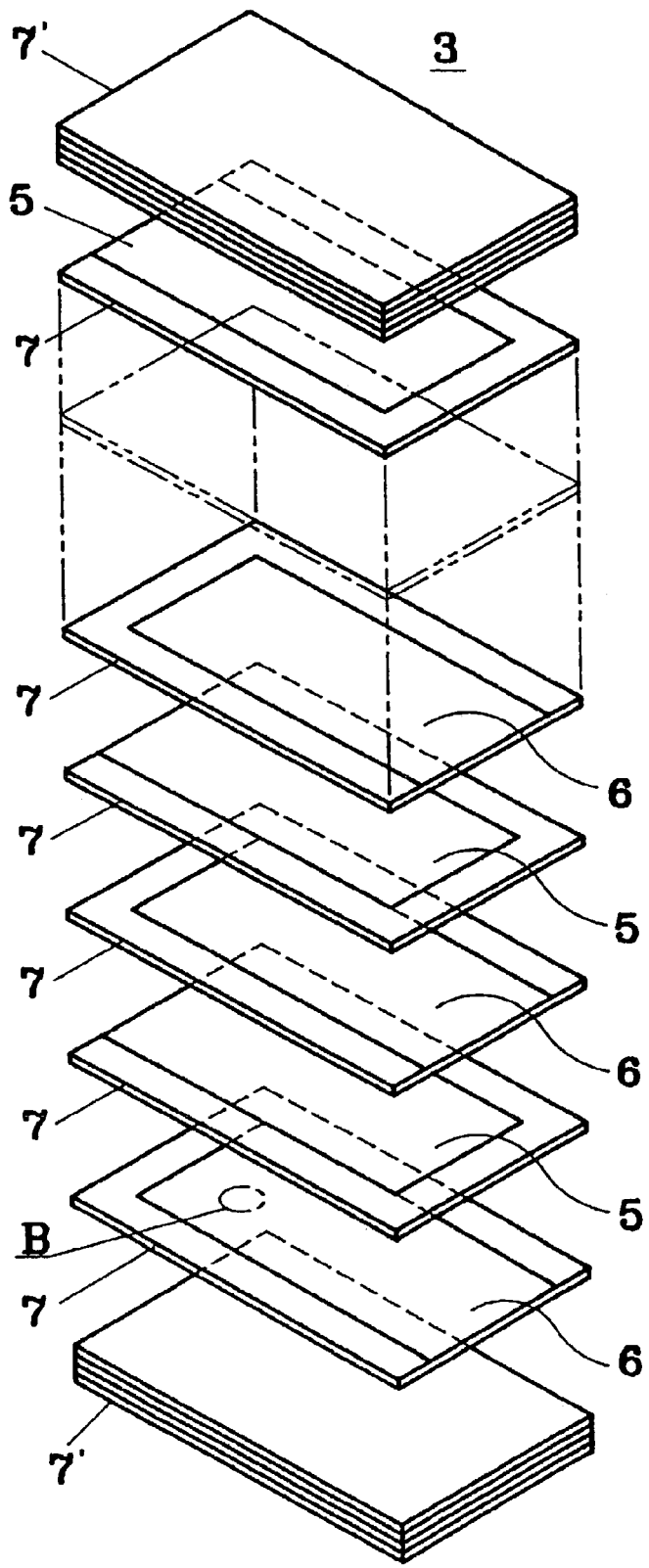
FIG. 3 describes an exploded perspective view of the multilayer ceramic capacitor shown in FIG. 1 and separately presents each layer of the laminated body thereof.
Figure 6:
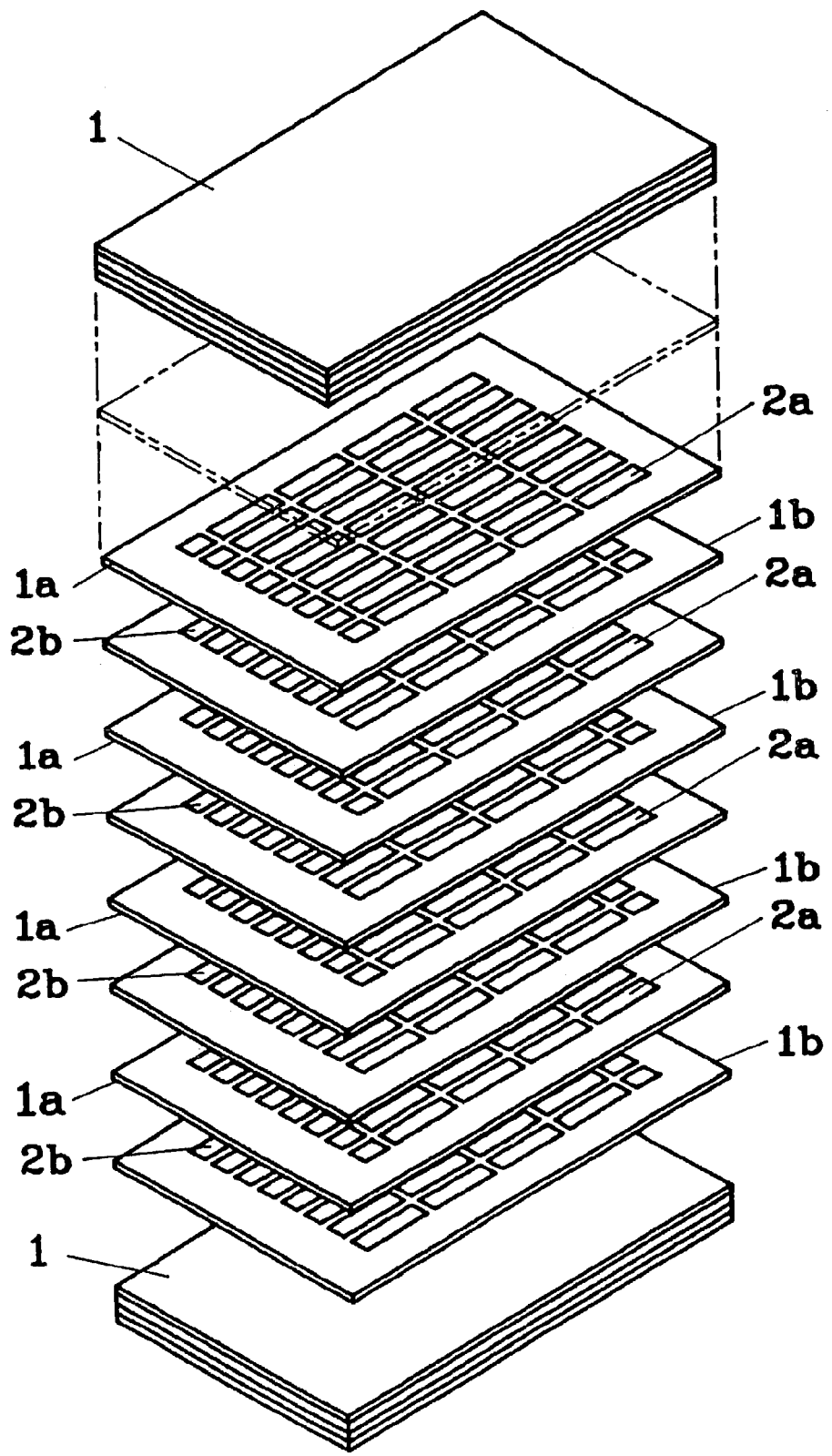
FIG. 6 offers an exploded perspective view of an arrangement of ceramic green sheets for forming the multilayer ceramic capacitor shown in FIG. 1.

As shown in FIG. 6, the ceramic green sheets 1a and 1b having the internal electrode patterns 2a and 2b printed thereon, respectively, are stacked alternately. Further, on top of the uppermost ceramic green sheet 1a and on bottom of the undermost ceramic green sheet 1b are, respectively, disposed dummy sheets, i.e., ceramic green sheets 1 without any internal electrodes printed thereon. Next, a laminated ceramic body is obtained by pressing the stacked sheets 1, 1a and 1b together. The laminated body is then diced in longitudinal and traverse directions to form unsintered laminated bodies having a predetermined size. Then, as shown in FIG. 1, the conductive paste such as the Ni paste is applied on the opposite end portions of the laminated body 3. Thereafter, the unsintered laminated bodies are sintered to form laminated bodies 3 as shown in FIG. 3.

On the conductive paste such as Ni paste, Cu is plated as a conductive film and Ni is plated over this conductive film. Further, by carrying out a Sn coating or soldering coating on the conductive film, a pair of external electrodes 2 is formed, resulting in a multilayer ceramic capacitor.

Figure 2:
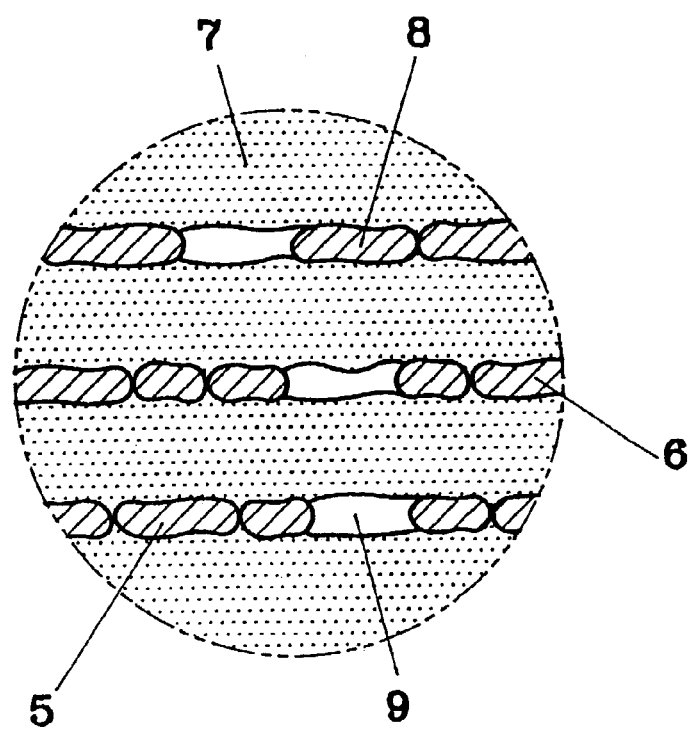
FIG. 2 illustrates an expanded view of section A shown in FIG. 1.

As the internal electrodes 5 and 6 get sintered during the sintering of the laminated body 3, metallic particles of the conductive paste forming the internal electrodes are rearranged. Thereafter, the metallic particles, i.e., the conductive particles constituting the internal electrodes, grow on a plane of the interface between the ceramic layers 7. As a result, as shown in FIG. 2, the conductive particles 8 constituting the internal electrodes 5 and 6 are changed into flat conductive particles grown on the plane of the interface between the ceramic layers. These flat conductive particles are arranged one by one on the plane of the interface to form film-shaped internal electrodes 5 and 6. The resulting internal electrodes 5 and 6 have a thickness of less than or equal to 3 $\mu$m.

At the initial stage of the sintering process for the laminated body 3 including the ceramic layers and internal electrodes therein, the thickness of the internal electrodes decreases as the metallic particles of the conductive paste are rearranged. After the completion of the rearrangement, the conductive paste constituting the internal electrodes starts to be sintered. During the sintering of the conductive paste, the metallic particles of the conductive paste congregate together by the act of the interfacial tension, which makes the thickness of the internal electrodes slowly increase. As a result, there are no substantial changes, before and after the sintering, observed in the thickness of the internal electrodes 5 and 6. On the other hand, the thickness of the ceramic layers 7 keeps decreasing through the sintering. As a result, cavities are formed in the internal electrodes 5 and 6 due to the differences in the shrinkage rates between the internal electrodes 5 and 6 and the ceramic layers 7 during the sintering. The characteristics of the cavities 9 such as the distribution, size and amount of cavities can be controlled by adjusting the composition of the conductive paste for the internal electrodes (i.e., the amount of metallic particles, the dielectric ceramic powder and the binder), the diameter of the conductive particles and/or the sintering profiles such as sintering temperature increase rates.

FIG. 2 is an expanded cross-sectional view of the internal electrodes and the ceramic layers exposed by burying the multilayer ceramic capacitor in an acryl based resin and grinding it in a direction perpendicular to the ceramic layers 7. That is, FIG. 2 is an expanded view of section A shown in FIG. 1.

As shown in FIG. 2, the internal electrodes 5 and 6 are formed by a series of flat conductive particles on the plane of the interface between ceramic layers 7. These internal electrodes 5 and 6, are not, however, formed continuously but include cavities 9 in which neither conductive films nor ceramic particles are disposed. Between adjacent cavities 9, there may be disposed less than 20 conductive particles. And each cavity 9 in the internal electrode is an empty space surrounded by the conductive particles therein, so that the cavities 9 are separated from each other and scattered in the internal electrodes 5 and 6. In addition, the top and the bottom of the empty space are covered respectively by the neighboring ceramic layers 7.

Further, an average size (or diameter) of the cavities 9 is preferably in a range from about 1.0 μm to about 10 μm, wherein the average size of the cavities 9 is obtained as follows: ten (10) multilayer ceramic capacitors are prepared and ground along the stacking direction to expose an internal electrode around the center portion of each capacitor. Then, the exposed internal electrode in the ground surface of each multilayer ceramic capacitor is magnified two thousand (2000) times by an SEM (scanning electron microscope), and five portions, e.g., four corner portions and a center portion, within the magnified internal electrode are photographed. Afterwards, a square region of 5 cm×5 cm is randomly chosen in each photograph, and a maximum width of each cavity in each square region is measured with vernier calipers in a predetermined direction. Thereafter, an average width of the maximum widths of the cavities in all the pictures is calculated, which is divided by the magnification (=2000) to get the average size of the cavities.

Figure 4:
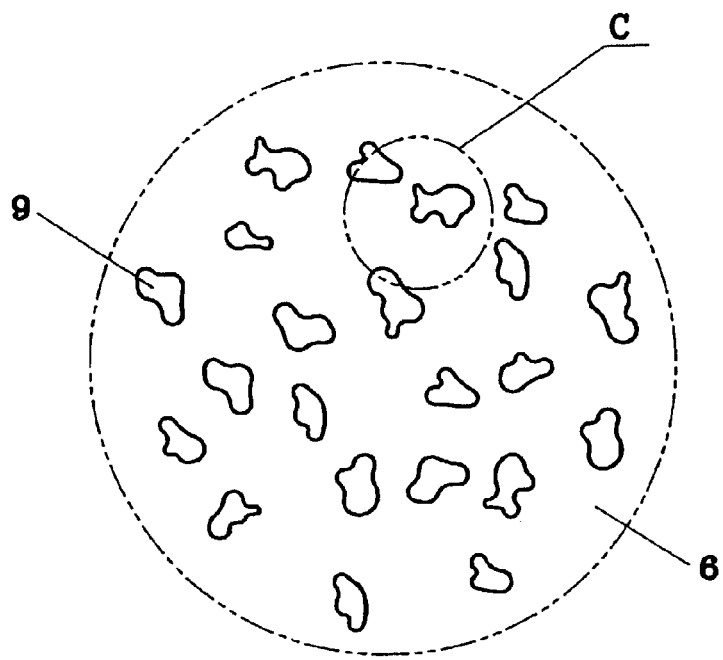
FIG. 4 represents an expanded view of section B shown in FIG. 3.
Figure 5:
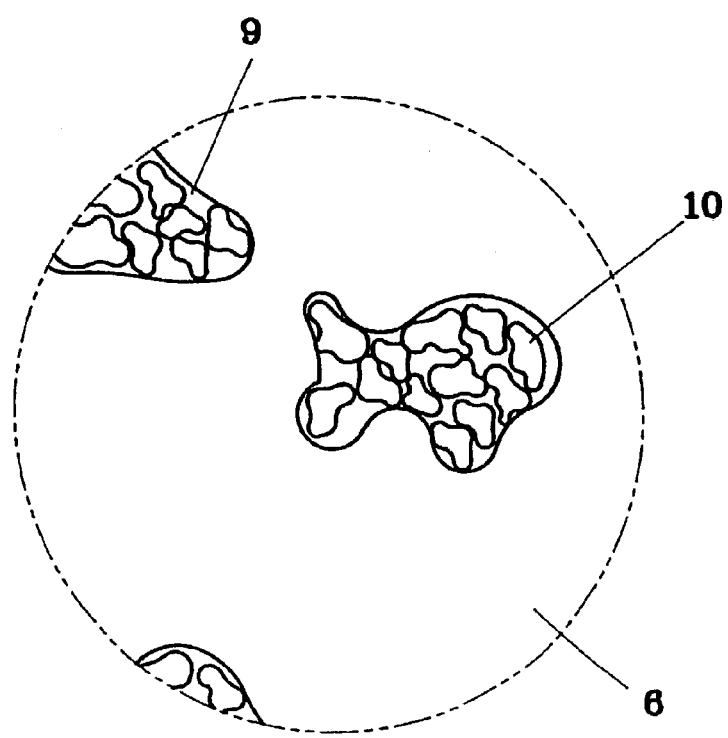
FIG. 5 depicts an expanded view of section C shown in FIG. 4.

FIG. 4 shows a partial plan view of the internal electrodes exposed by burying the multilayer ceramic capacitor in an acryl based resin and grinding it in a direction parallel to the ceramic layers 7. That is, FIG. 4 is an expanded view of section B shown in FIG. 3. Further, FIG. 5 shows a schematic expanded view of section C shown in FIG. 4.

The cavities 9 shown in FIG. 4 have neither the conductive particles 8 nor the ceramic particles 10. In FIG. 5 some ceramic particles of the adjacent ceramic layer can be seen through the cavities 9. The size of each cavity may correspond to, e.g., more than ten (10) ceramic particles. These cavities 9 preferably occupy about 25% to about 75% of the area of the internal electrodes 5 and 6, e.g., about 50%. The percentage of the area occupied by the cavities is obtained as follows: First, the maximum width of each cavity is measured as aforementioned. And area of each cavity in each square region of 5 cm×5 cm is calculated by assuming that each cavity is a circle having its maximum width as a diameter thereof. Then, a ratio of a total area occupied by all the cavities in all the square regions to that of the whole square region is calculated as the occupancy of the cavities.

The following Example is intended to further exemplify the present invention, but is not to be construed to limit the scope of the present invention.

EXAMPLE

A slurry was formed by uniformly dispersing 100 weight % of barium titanate into 10 weight % of ethyl cellulose dissolved in 80 weight % of terpineol. A ceramic green sheet was prepared from the slurry by thinly and uniformly applying the slurry on polyethylene terephthalate film and then drying it. Next, after the ceramic green sheet was delaminated from the film, it was cut into ceramic green sheets having the size of 150 mm×150 mm.

Next, the conductive paste for the internal electrodes was obtained by mixing 100 weight % of Ni powder with 8 weight % of ethyl cellulose and uniformly dispersing the mixture in 100 weight % of terpineol. The diameters of the particles of Ni powder were less than about 1 μm.

Thereafter, as shown in FIG. 6, the Ni conductive paste was applied on the ceramic green sheets by using a screen printer to form the internal electrode patterns 2a and 2b having an average thickness of about 2.5 μm.

Then, the ceramic green sheets 1a, 1b with the internal electrode patterns 2a and 2b, respectively, were stacked alternately. Further, on top of the uppermost ceramic green sheet and on bottom of the undermost ceramic green sheet, there were, respectively, disposed dummy sheets, i.e., ceramic green sheets 1 without any internal electrode patterns printed thereon. Thereafter, a laminated ceramic body was formed by pressing the stacked ceramic sheets 1, 1a and 1b together in their stacked direction under a temperature of 120° C. and a pressure of 200 ton.

The laminated ceramic body was diced into unsintered laminated bodies having the size of 3.2 mm×1.6 mm. The Ni paste was applied on the opposite sides of each unsintered laminated body. Then, they were sintered at 1320° C. to form sintered laminated bodies 3. The sintering temperature increase rate was 100° C./hr. Further, electroless Cu plating was performed on the sintered laminated bodies and then electrolysis Ni plating was performed thereon. Subsequently, a pair of external electrodes was formed by solder plating, resulting in a multilayer ceramic capacitor as shown in FIG. 1.

After burying fifty (50) pieces of the multilayer ceramic capacitors in polymethyl methacrylate, and grinding them in a direction perpendicular to the interfaces between the ceramic layers 7, the internal electrode patterns 5 and 6 and the ceramic layers 7 were observed by using an optical microscope. As shown in FIG. 2, a series of flat conductive particles were found to be disposed on the plane of the interface between the ceramic layers 7, forming the internal electrodes 5 and 6. Further, cavities 9 were formed in the internal electrodes 5 and 6 in which neither conductive particles nor ceramic particles prepared in accordance with the process described above were found to exist. At most fifteen (15) pieces of the conductive particles 8 were disposed between the adjacent cavities 9.

Moreover, after burying additional fifty pieces of the multilayer ceramic capacitors prepared in accordance with the process described above in polymethyl methacrylate, and grinding them in a direction parallel to the interfaces of the ceramic layers 7, the internal electrodes 5 and 6 were observed by using an optical microscope. As shown in FIG. 5, cavities 9 were found in the internal electrodes 5 and 6. These cavities 9 occupied about 49% of the areas of the internal electrodes 5 and 6. In those one hundred (100) pieces of multilayer ceramic capacitors described above, there were found no cracks in the laminated bodies thereof.

Another set of fifty (50) multilayer ceramic capacitors manufactured at the same time with the above one hundred pieces were soldered to lands on a circuit board for the purpose of checking if any cracks were developed during the soldering process for the manufacture of an end product such as cellular phone; and, the result of microscopic inspection showed that there were no cracks developed in the laminated bodies.

COMPARATIVE EXAMPLE

This Comparative Example is intended to illustrate the criticality and interrelationship of such control variables as the composition of the conductive paste and the sintering profile.

A total of one hundred and fifty (150) multilayer conductive capacitors were prepared by the same method as used in the Example described above except that: 10 weight % of barium titanate based on the total weight of Ni powder was added to the conductive paste composition for the internal electrodes; and the sintering temperature increase rate was lowered to 50° C./hr.

After burying fifty (50) pieces of the multilayer ceramic capacitors in polymethyl methacrylate, and grinding them in a direction perpendicular to the interfaces between the ceramic layers. 7, the internal electrode patterns 5 and 6 and the ceramic layers 7 were examined by using an optical microscope. Between the ceramic layers 7 were disposed a series of conductive particles, forming the internal electrodes 5 and 6. However, the cavities 9 were disposed sparsely.

Moreover, after burying additional fifty (50) pieces of the multilayer ceramic capacitors in polymethyl methacrylate, and grinding them in a direction parallel to the interfaces between the ceramic layers 7, the internal electrodes 5 and 6 were observed by using an optical microscope. The result confirmed the existence of cavities 9 and showed the cavities 9 occupied only 23% of the area of the internal electrodes 5 and 6. In those one hundred (100) pieces of multilayer ceramic capacitors tested above, there were found no cracks developed in the laminated bodies thereof.

The remaining set of fifty (50) multilayer ceramic capacitors manufactured at the same time with the above 100 capacitors were soldered to lands on a circuit board; and a microscopic inspection thereof showed that there were developed eighteen (18) cracks.

While the present invention has been described with respect to the particular embodiments, it will be apparent to those skilled in the art that various changes and modifications may be made without departing from the spirit and scope of the invention as defined in the following claims.

What is claimed is:

1. A multilayer ceramic capacitor comprising:
   ceramic layers including ceramic particles; and
   internal electrodes including conductive particles, each internal electrode having two neighboring ceramic layers and being provided with cavities and the cavities having an average size ranging from about 1.0 $\mu$m to about 10 $\mu$m and occupying about 25% to about 75% of an area of each internal electrode,
   wherein the ceramic layers and the internal electrodes are stacked alternately and each cavity in an internal electrode is formed of an empty space enclosed by conductive particles of the internal electrode and ceramic particles of the neighboring ceramic layers of the internal electrode.

2. The multilayer ceramic capacitor of claim 1, wherein said each cavity in the internal electrode is surrounded by the conductive particles along a direction parallel to the internal electrode.

3. The multilayer ceramic capacitor of claim 1, wherein the internal electrodes have a film thickness of less than or equal to 3 $\mu$m.

4. The multilayer ceramic capacitor of claim 3, wherein the cavities occupy about 35% to about 65% of an area of each internal electrode.

5. The multiplayer ceramic capacitor of claim 4, wherein the cavities occupy about 40% to about 60% of an area of each internal electrode.

6. The multilayer ceramic capacitor of claim 1, wherein each internal electrode has a rectangular shape.

* * * * *